(12) United States Patent
Olliphant et al.

(10) Patent No.: US 11,836,328 B1
(45) Date of Patent: Dec. 5, 2023

(54) SYSTEM TO TRANSLATE A CURSOR BETWEEN MULTIPLE DISPLAYS

(71) Applicants: Dean Olliphant, San Francisco, CA (US); Sabrina Olliphant, San Francisco, CA (US)

(72) Inventors: Dean Olliphant, San Francisco, CA (US); Sabrina Olliphant, San Francisco, CA (US)

( * ) Notice: Subject to any disclaimer, the term of this patent is extended or adjusted under 35 U.S.C. 154(b) by 0 days.

(21) Appl. No.: 18/047,536

(22) Filed: Oct. 18, 2022

(51) Int. Cl.
*G06F 3/04812* (2022.01)
*G06F 3/01* (2006.01)
*G06V 40/20* (2022.01)
*G06V 10/774* (2022.01)
*G06F 3/14* (2006.01)

(52) U.S. Cl.
CPC .......... *G06F 3/04812* (2013.01); *G06F 3/013* (2013.01); *G06F 3/1423* (2013.01); *G06V 10/774* (2022.01); *G06V 40/20* (2022.01)

(58) Field of Classification Search
CPC . G06F 3/01; G06F 3/012; G06F 3/013; G06F 3/03543; G06F 3/038; G06F 3/048; G06F 3/0481; G06F 3/0482; G06F 3/0483; G06F 3/04842; G06F 3/0485; G06F 3/0486; G06F 3/14; G06F 3/167; G06F 2203/04801; G06F 3/1446; G09G 2320/0693; G09G 2354/00; G09G 5/08; G09G 5/14
See application file for complete search history.

(56) References Cited

U.S. PATENT DOCUMENTS

| | | | |
|---|---|---|---|
| 9,652,033 B2 | 5/2017 | Smith et al. | |
| 10,031,577 B2 | 7/2018 | Mclean | |
| 10,627,900 B2 * | 4/2020 | Publicover | G06V 40/18 |
| 10,671,161 B2 | 6/2020 | Krishnakumar | |
| 11,582,312 B2 * | 2/2023 | Berliner | G06T 19/006 |
| 2012/0272179 A1 | 10/2012 | Stafford | |
| 2012/0326945 A1 | 12/2012 | Ellis et al. | |
| 2019/0064513 A1 | 2/2019 | Bagherpour et al. | |
| 2020/0133389 A1 | 4/2020 | Chiu et al. | |

* cited by examiner

*Primary Examiner* — Nelson M Rosario
(74) *Attorney, Agent, or Firm* — Schwegman Lundberg & Woessner, P.A.

(57) ABSTRACT

The present disclosure relates to eye tracking technology to detect when a user's attention has shifted to a different screen. Once this is detected, the mouse pointer can be positioned on that screen. For example, one approach can include a first display and a second display. Sensor data, indicative of a radial gaze direction of a user, can be received. Display of a cursor can be manipulated, such as between the first display and the second display, based on the sensor data.

8 Claims, 11 Drawing Sheets

SYSTEM TO TRANSLATE A CURSOR BETWEEN MULTIPLE DISPLAYS

TECHNICAL FIELD

The present disclosure relates generally to user interfaces and more particularly to user interfaces having multiple displays.

BACKGROUND

Modern work often can involve the concurrent use of multiple displays. For example, users sometimes have a dedicated auxiliary display for one particular purpose, such as Slack or Discord, in addition to a main display for other tasks. In another example, a user can use a portable computer in a plurality of work environments, such as alternating between a home office and a work office. During use of the portable computer, a user may transition from one configuration to another (i.e., different connections including displays) where display sizes and relative positions between the plurality of environments differ.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present disclosure.

DETAILED DESCRIPTION

Figure 1:
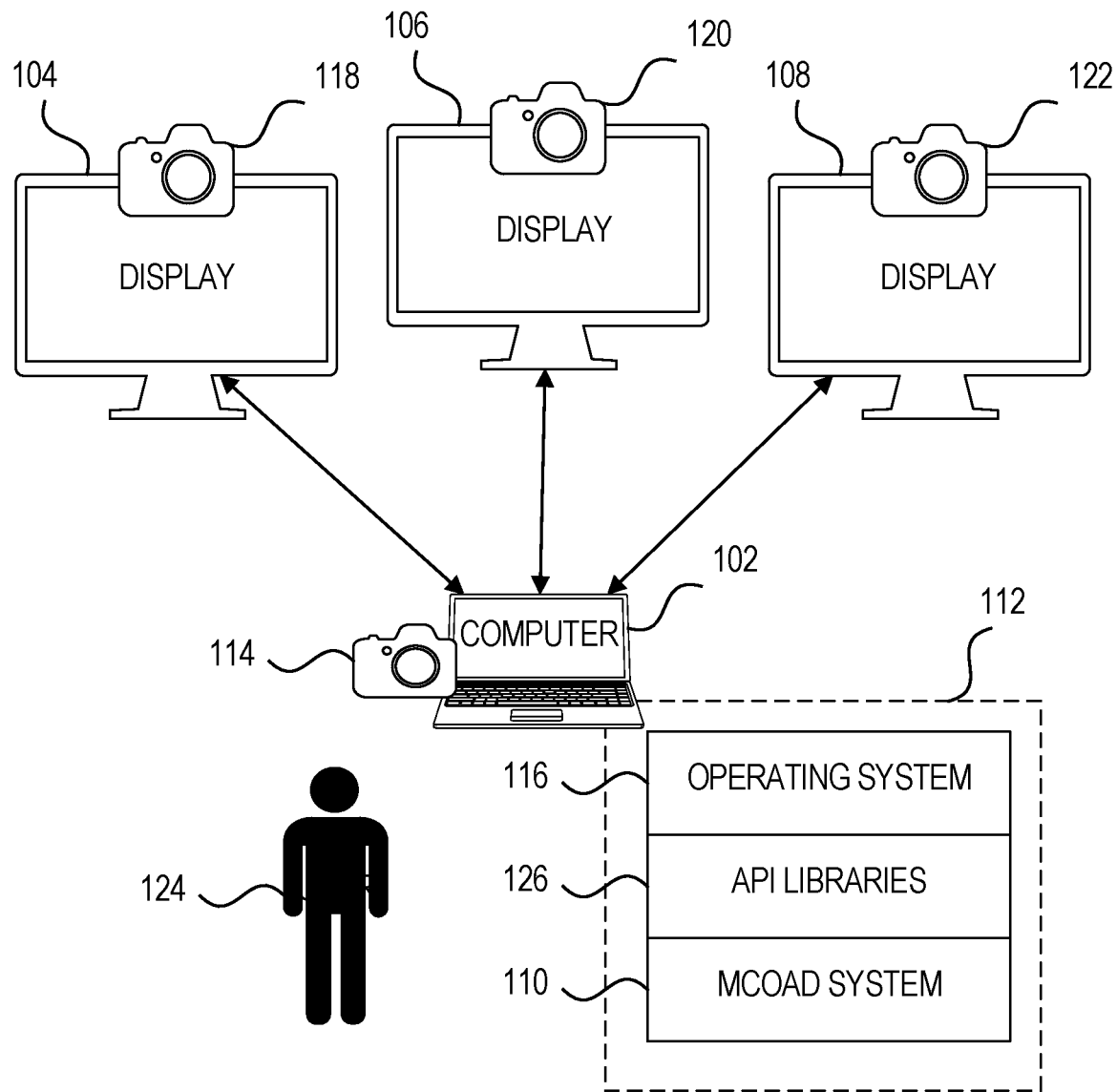
FIG. 1 is a block diagram illustrating a computing environment in accordance with some examples of the present disclosure.

When using multiple display windows across multiple displays, a user can find it challenging to adjust to differing display configurations. Simple tasks like scrolling a Slack channel or moving to a next message are complicated by the process of finding a correct border gap through which to move the mouse cursor from a primary display to the auxiliary display.

The present disclosure relates to eye tracking technology to detect when a user's attention has shifted to a different screen. It is desirable to determine where the user is looking on the screen to allow for movement of the cursor in a corresponding direction. The term "cursor" as used in the present disclosure refers to a graphical representation of a pointing device, such as a mouse. For example, a cursor can be moved by a user using the mouse or similar pointing device, e.g., track pad, track ball, capacitive touch screen, etc. For example, if a user is gazing at a computer monitor amongst several computer displays, and the user wants to move the cursor to a different portion of the available viewing area, the user may focus their gaze in a new direction before they manipulate their cursor accordingly. Thus, there can be a delay before the cursor is moved to the new location. This delay may be frustrating for the user, and a more responsive cursor can make a computer user's experience more intuitive and effective. Eye tracking technology can be used to more accurately detect when the user has shifted his or her attention from one portion of available viewing area (such as a first monitor) toward another portion of available viewing area (such as a second monitor. As a result, a user may more accurately control the cursor to move to an alternate area of the screen.

In some examples of the present disclosure, methodologies and systems are provided to move a pointing device cursor in a computing system having a first display and a second display. A computing system receives sensor data indicative of a radial gaze direction of a user where the radial gaze direction has a horizontal component. The computing system displays a pointing device cursor on the first display of the computing system where the pointing device cursor can be further manipulated by the user.

In some examples, the pointing device cursor can be movable on one of the first and second displays via corresponding movement of a pointing device. A first automated gaze tracking operation is performed to determine that the gaze of the user is directed to the first display of the computing system at a first time, the first automated gaze tracking operation including comparing the received sensor data indicating a first radial gaze direction of the user at the first time with a predetermined relative position of the first screen to the second screen.

In some examples, a second automated gaze tracking operation is performed to determine that the gaze of the user has transitioned to the second display of the computing system at a second time. For example, the second automated gaze tracking operation includes comparing the received sensor data indicating a second radial gaze direction of the user at the second time with a predetermined relative position of the second screen relative to the first screen. The cursor is translated in response to a determination that the gaze of the user has transitioned to the second display, such as translating from a first set of coordinates on the first display to a second set of coordinates on the second display independently of movement of the pointing device.

In some examples, the computing system receives sensor data indicative of a tangential gaze direction of a user having a vertical component. In some examples, the first set of coordinates and the second set of coordinates are at least one of the same or analogously scaled to one another. In some examples, the first set of coordinates and the second set of coordinates are different, and the second set of coordinates is at least partially determined based on the second automated gaze tracking operation and the second radial gaze direction.

In some examples, the first set of coordinates and the second set of coordinates are different, and the second set of coordinates is located at a center of the second display. In some examples, the first set of coordinates and the second set of coordinates are different, and the second set of coordinates is based on a previously used position of the cursor on the second display. In some examples, the computing system dynamically alters, in response to the translation, a visual characteristic of the pointing device cursor.

In some examples, the visual characteristic includes a size of the pointing device cursor. In some examples, the visual characteristic includes a color of at least a portion of the pointing device cursor. In some examples, dynamically altering the visual characteristic of the pointing device cursor includes reverting the visual characteristic of the pointing device cursor to a state before the dynamic alteration.

In some examples, a computing system receives sensor data indicative of a tangential gaze direction of a user having a vertical viewing component. In some examples, a machine learning model identifies visual patterns based on the sensor data where the visual patterns correspond to the radial gaze direction and the tangential gaze direction. In some examples, the machine learning model analyzes the sensor data for determining respective radial and tangential gaze directions at a plurality of time stamps.

Each of the non-limiting examples described herein can stand on its own, or can be combined in various permutations or combinations with one or more of the other examples.

FIG. 1 is a block diagram illustrating a computing environment in accordance with examples of the present disclosure. The computing environment can be used to implement some examples and within which a user is presented with a graphical display on multiple computer displays or display surfaces. Generally, the present disclosure relates to a system that provides to a user a user interface allowing graphical input into a computing system, such as computer 102, or another electronic device.

In some examples, the system can include or use one or more sensors, such as sensors 114, 118, 120, and 122, that detect the position or direction of the gaze of the user 124. For example, based on an eye position of the user 124, the system adjusts the position of a cursor being displayed on the user interface. In some examples, the pupil of an eye of the user 124 is detected. By detecting the size and location of a pupil of the eye, the system determines the gaze position or direction of the user 124. In some examples, the one or more sensors 114, 118, 120, and 122 include a camera or a video camera that capture image data used to determine the position of one or more of a user's eyes.

In some examples, the one or more sensors 114, 118, 120, and 122 include an infrared camera that detects movement of the eye of the user 124.

In some examples, the sensors 114, 118, 120, and 122 are disposed in a remote location such that the user 124 can gaze at the lens of the one or more sensors 114, 118, 120, and 122 without approaching them.

In some examples, an eye of the user 124 includes one or more portions that can be used to determine the position or location of the eye of the user 124. For instance, the one or more sensors 114, 118, 120, and 122 can include one or more portions of an iris of the eye of the user 124. Also, the one or more sensors 114, 118, 120, and 122 can include one or more portions of the cornea of the eye of the user 124.

In some examples, the one or more sensors 114, 118, 120, and 122 provide image data used to determine a radial gaze direction of a user 124. Herein, "radial gaze direction" refers to a direction within an azimuth of horizontal viewing positions, such as one of several directions the user 124 may gaze from left to right. As such, the radial gaze direction has at least one horizontal component, such as an azimuth between about 0° (user 124 gazing far left) to about 180° (user 124 gazing far right). For example, an azimuth of about 90° can be characterized as a radial gaze direction that is substantially normal to a central viewing area of the multiple displays. Other similar coordinate systems can be used to define the at least one horizontal component. In some examples, the one or more sensors 114, 118, 120, and 122 provide image data to help determine a radial gaze direction of a user 124.

In some examples, the one or more sensors 114, 118, 120, and 122 provide image data to help determine a tangential gaze direction of a user 124. Herein, "tangential gaze direction" can refer to a direction that is approximately tangential to radial gaze direction with a vertical or elevational component, such as one of several directions a user 124 may gaze from up to down. For example, an azimuth between about 0° (user 124 looking straight up) and about 180° (user 124 looking straight down). For example, an azimuth of about 90° can be characterized as a tangential gaze direction that is approximately normal to a central viewing area of the multiple displays. Other similar coordinate systems can be used to define the tangential gaze direction. A combination of the radial gaze direction (horizontal component) and the tangential gaze direction (vertical component) of the user 124 can be used to determine a full three-dimensional gaze position.

In some examples, the one or more sensors 114, 118, 120, and 122 include a light source or a light detector. In some examples, the one or more sensors 114, 118, 120, and 122 include a light source (e.g., an infrared light source) and a light detector that detects the light reflected from the eye of the user 124. In some examples, one or more sensors are integrated with a wearable device, a contact lens, or another device that can be used to detect eye position.

In some examples, the computer 102 includes or is connected to multiple displays having display surfaces, such as displays 104, 106, and 108. The displays 104, 106, and 108 can be display hardware, such as a monitor, or other type of display surface. A display includes a display surface that includes a screen on which an image is presented to a user. Display surfaces include transmissive and reflective LCDs, OLEDs, plasma, light-emitting diodes (LEDs), electronic paper, e-ink, and other types of display surfaces that can be used to present content to a user. Displayed content may include a page in a web browser, a document in a word processor, a graphic in a drawing application, and the like. A cursor, including a text cursor, a pointer cursor, a hand cursor, or the like is displayed on a display surface of a display. For example, the cursor is displayed on the display 104, on the display 106, or on the display 108.

In some examples, the computer 102 includes or is connected to one or more processors 112. A processor 112 can include or use an operating system 116, one or more application programming interface (API) libraries 126, and a Mouse Cursor on Active Display (MCOAD) system. The operating system 116 can be any of several operating systems, such as but not limited to MS-DOS, LINUX, WINDOWS, OS/2, MAC OS, UNIX, etc. The API libraries 126 can include MSCAPI, WINDOWS CURSES API, GTK-CRITICAL, GTK2, GTK1, XMCLIB, and the like. The MCOAD system can include any of several suitable MCOAD systems such as the XCURSOR, MOX, WURZ, TURBOCURSOR, DYXCURSOR, XFOCURSOR, and the like.

Figure 2:
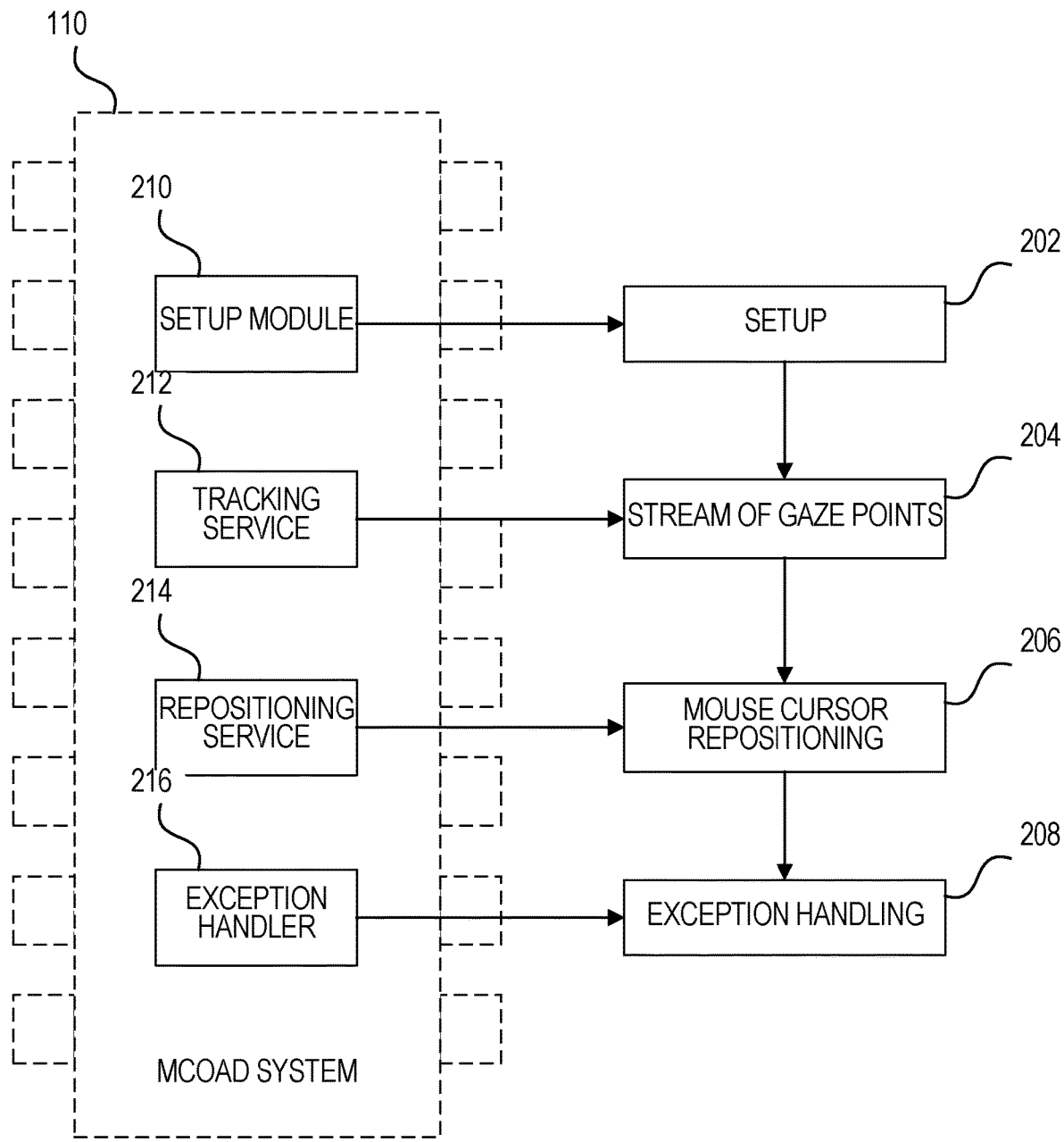
FIG. 2 is a block diagram illustrating components and primary operations of an MCOAD system in accordance with some examples of the present disclosure.

FIG. 2 is a block diagram illustrating components of a MCOAD system 110, according to some examples. The components include a setup module 210 that performs system setup at operation 202, a tracking service 212 that tracks a user's gaze point, and publishes information regarding the gaze point at operation 206, a repositioning service 214 that consumes the gaze point information and chooses whether and where to reposition a mouse cursor at operation 206, and an exception handler 216 that handles exceptions at operation 208. As used herein, an "exception" is a condition that arises when the MCOAD system 110 has encountered an error in processing or during a setup operation, such as operation 202. An exception can be one of a range of possible exceptions, including for example, errors from communications, input from the user, or communications with the user. The exception handler 216 can be configured to attempt to address some of the exceptions.

Figure 3:
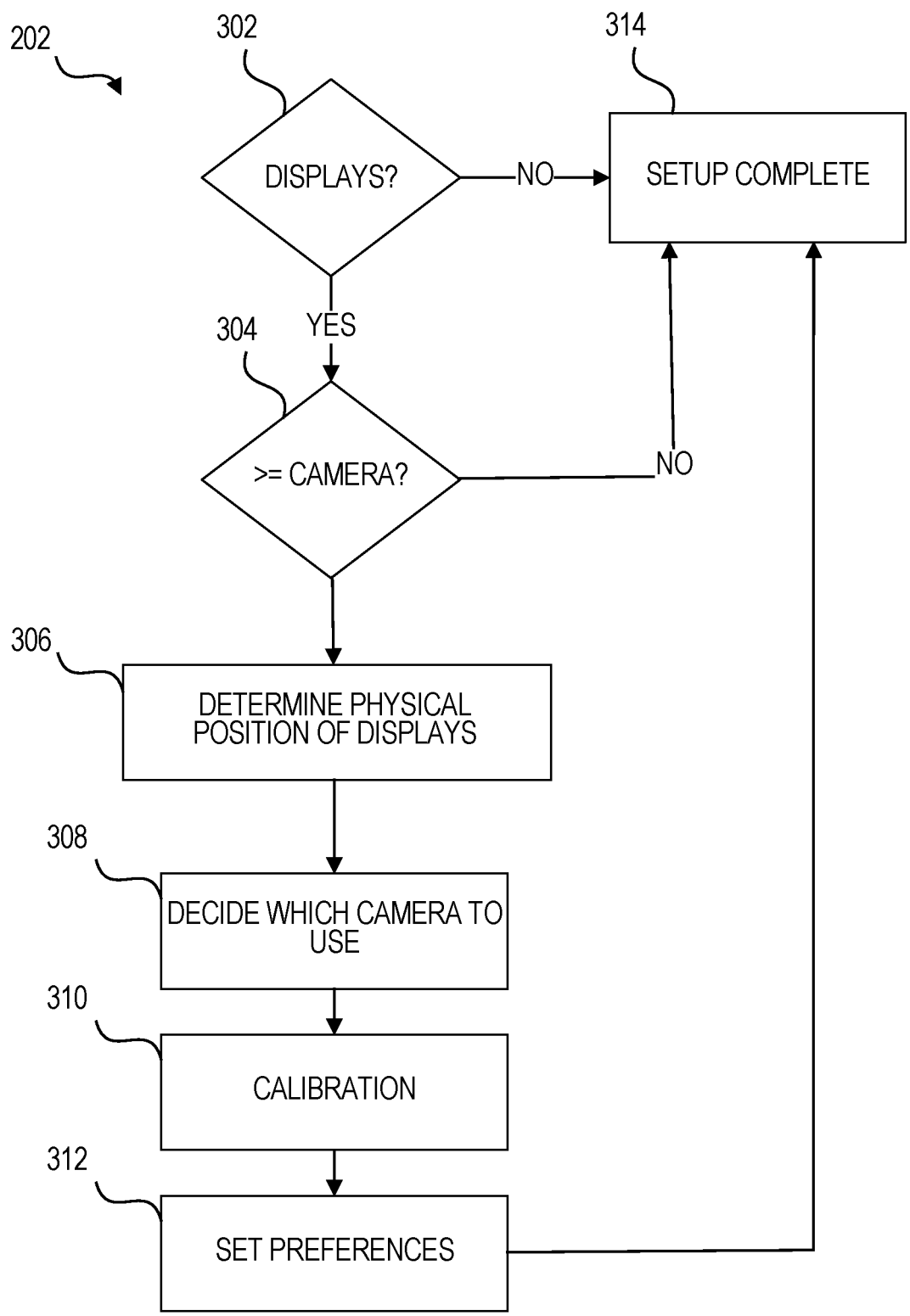
FIG. 3 is a flowchart illustrating sub-operations of a setup operation performed by a setup module in accordance with some examples of the present disclosure.

FIG. 3 is a flowchart illustrating sub-operations of the setup operation 202 performed by the setup module 210. The setup operation 202 is invoked when setting up the MCOAD system 110 for the first time, and any time that a change in configuration is required.

In operation 302, the setup module 210 determines if the computer 102 is operably connected to more than one display. If not, the setup module 210 transitions to operation 314 thus terminating the setup process.

In operation 304, the setup module 210 checks for the presence of one or more cameras operably connected to the computer 102. If in operation 304 the setup module determines that there are no cameras, the setup module 210 transitions to operation 314 thus terminating the setup process.

Figure 6:
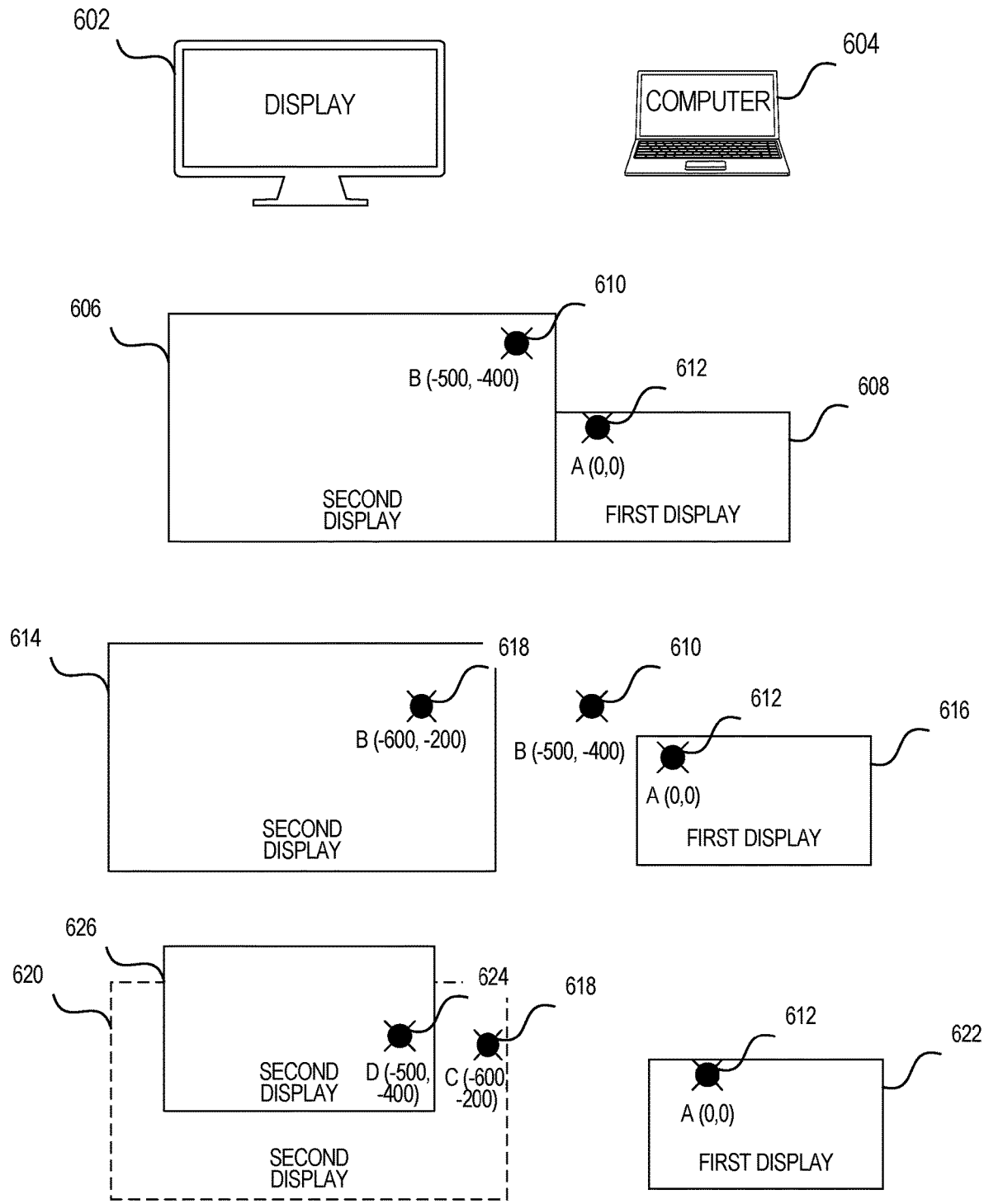
FIG. 6 illustrates various display layouts in accordance with some examples of the present disclosure.

In operation 306, the setup module 210 determines the physical layout of the displays. In some examples, the setup module 210 queries the operating system for information about the layout of the displays. Generally, a computer operating system will model the layout of multiple displays in an adjacent manner such that the operating system understands which segments of each monitor or display's perimeter a mouse cursor can move through in order to move to a different display. For instance, FIG. 6 illustrates a display layout model for a computer 604 has a display 602 that has been extended using multiple displays where a second display 606 and first display 608 are in adjacent positions. If the displays have the physical layout described by the operating system, then gaze point B 610 at coordinates [−500, −400] would inform the MCOAD system 110 to position a mouse cursor on a second display 606. In a like manner, gaze point A 612 at coordinates [0,0] would inform the MCOAD system 110 to position a mouse cursor on a second display 606.

It can be helpful to understand that computer operating systems typically use a coordinate system where the origin is the top left corner of the primary display. Positive x values increase with the distance to the right of this point, and, unlike a cartesian coordinate system, positive y values increase with the distance below this point.

If a large physical gap is present between one display and the next, the MCOAD system 110 can need the user to provide information about the gap size so that it will be able to map a user's gaze point more accurately to a specific display device. FIG. 6 further illustrates a display layout model with second display 614 and first display 616 that can include a gap. In this case, gaze point B 610 would not correspond to a position on first display 616, while gaze point C 618 would correspond to gaze point B 610 if the displays had been adjacent.

Another consideration for operation 306 is to build an understanding of the z-axis distance, or depth, between or among the displays. FIG. 6 further illustrates a layout model in which second display 626 sits at some distance farther behind first display 622. Thus in this case, gaze point C 618 would not correspond to a position on second display 620, while gaze point D 624 would correspond to gaze point C had display 626 been at the same distance from the user as first display 622.

In a situation where the system has access to multiple cameras, the user can select which camera to use in order to determine a user's gaze point in operation 308. A variation of this step would involve the MCOAD system 110 preselecting a default camera and providing an option for the user to select a different camera.

Depending on the performance of the eye-tracking models, some calibration can be required as provided for in operation 310. Eye-tracking methodologies have been developed to accommodate a wide variety of face and eye shapes in a variety of environments, with and without glasses, etc. In some examples, a model is retrained for users that have unusual facial or eye features, such as if a user is disfigured or has amblyopia (lazy eye). The calibration operation 310 involves collecting training examples of different gaze points from the user and using this data to augment the gaze point model.

In operation 312, the user is offered the ability to set their preferences for the MCOAD system 110.

In some examples, a user preference is where the mouse cursor should be placed once the MCOAD system 110 detects that the user has directed their attention to a display that is not hosting the mouse cursor. Options include placing the mouse cursor in the middle of the display, placing the mouse cursor in the last position it was in on that display, placing the mouse cursor at the user's gaze point, and the like.

Another example preference can include whether or how to notify the user that the mouse cursor has been positioned on a different display. One option might include changing the cursor in size or color in order to attract the user's visual attention to its new position. Another option might involve making an audible sound when the mouse cursor is repositioned.

In some examples, as part of the preference set up, a user identifies different configurations. For example, a user can have one display configuration at home and a different configuration at their office.

In some examples, a user preference relates to an amount of time a user needs to look at a different display before the mouse cursor is repositioned.

In some examples, a user preference allows the user to decide the sensitivity level for determining whether a user has directed their attention to a different display. For the sake of clarity, sensitivity is a proxy for the eye tracking model's confidence level, and can reflect technical values for accuracy, precision, or recall.

Machine learning models, such as that described with reference to FIG. 7, can improve their accuracy a) with more training examples and/or b) with additional data features. Training examples (a) include data about what a user appears like when looking at a confirmed gaze point. Additional data features (b) could include a camera's angle relative to a user's face, or whether the display or system is in motion. To the extent that capturing or sharing additional training examples and/or additional data features is desired in order to improve model performance, and to the extent that this capturing or sharing of information can represent privacy considerations, one set of preferences can involve a user agreeing to share this information or a user granting permission to capture additional data features.

In some examples of the MCOAD system 110, the user is given a setup option to create zones within a single display. The MCOAD system 110 treats these zones as virtual displays. For example, if a user moves their attention from one zone on a very large display to a different zone on the same display, the MCOAD system 110 repositions the mouse cursor to the new zone in the same way it would with a different physical display.

Once the setup is complete, the setup module 210 transitions to operation 314.

Figure 4:
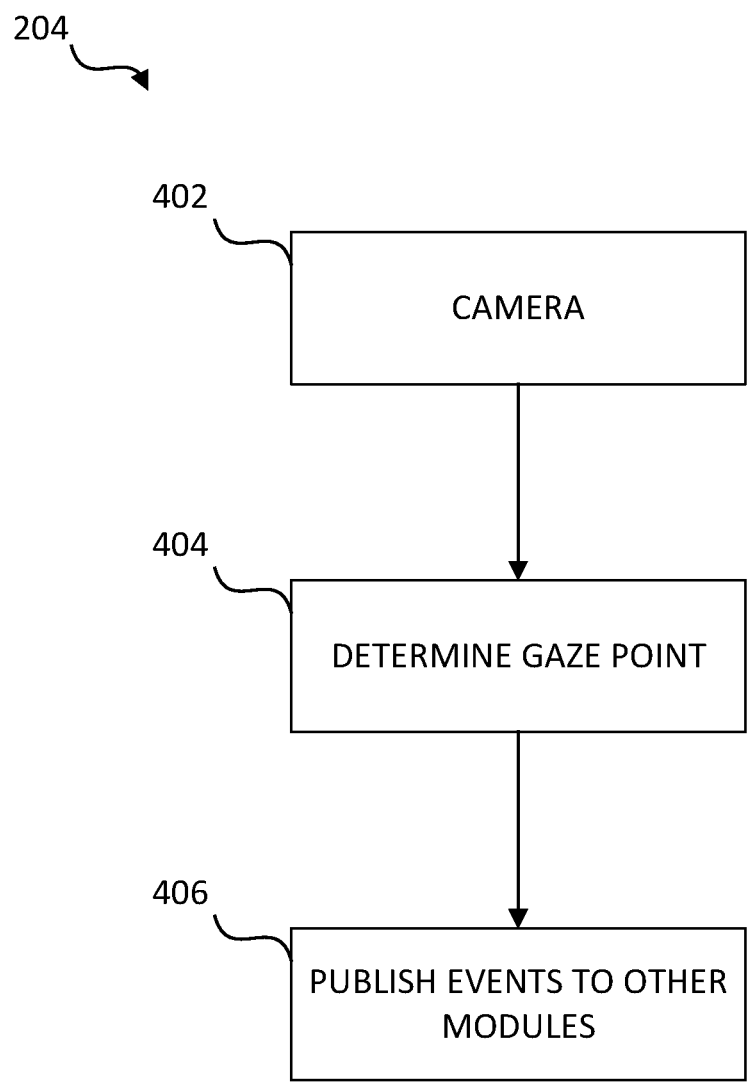
FIG. 4 is a flowchart illustrating sub-operations performed by a tracking service in accordance with some examples of the present disclosure.

FIG. 4 is a flowchart illustrating sub-operations performed by a tracking service 212 (of FIG. 2) during operation 204 to performs eye tracking and publishes gaze point information for consumption by other components.

In operation 402, the tracking service 212 receives image data from one or more cameras, such as sensors 114, 118, 120, and 122, as a primary source of information for determining a user's gaze point. The one or more cameras provide a stream of image data to the tracking service 212.

In operation 404, the tracking service 212 can operate in any number of ways. Although any number of machine learning models, or rule-based logic systems, or combinations (ensemble models) of those could be employed to convert user images into gaze point information, a neural network model is used in an example. Neural models simulate nodes in a series of layers, where each layer's input is the output of the previous layer. The input for the first layer is the image data about the user, and the output of the final layer is the gaze point information. Neural models are initially trained using examples that determine the weights and connections across the nodes. Once trained, the model can pipeline image inputs into gaze point outputs quickly and efficiently.

The algorithm can be trained to accept as inputs other information in addition to the camera. For example, if the device attached to the camera has an accelerometer, it is able to provide tilt information for the camera, or information about whether the camera is moving. This information can be used an eye tracking algorithm. For example, accelerometer data can be used to provide a tilt factor, where the tilt factor is a percentage of the tilt of the user's head relative to the camera's view. For example, if a camera is pointing straight up from a table and the user is leaning to one side, the tilt factor for that user is 50% (because the user is leaning 50% in one direction). If the camera is pointing straight up from a table and the user is head-on facing the camera, the tilt factor is 0%. A high positive tilt factor indicates that the user is leaning toward the device, and a high negative tilt factor indicates that the user is leaning away from the device. Thus, accelerometer data, combined with images and other information, can be used as inputs to the tracking algorithm to determine the user's gaze point more precisely and effectively. In some embodiments, tilt factor data can also be used to further fine-tune the model to determine gaze points more accurately.

In 406, the tracking service 212 publishes gaze point information for consumption by other components. The amount and type of information can vary. In its simplest form, the information published is an estimate of the gaze point coordinates, however this information can include additional information such as an accuracy estimate or gaze duration.

Data for the coordinates can take any number of forms. In some examples, the tracking service 212 publishes pixel coordinates using a standard display coordinate system for computer displays.

A more detailed version of the published information can include estimates for the physical location of the user's eyes relative to the camera, along with estimates for the gaze angle.

It can be desirable for privacy reasons to minimize the information that is published to other components, in which case the tracking service 212 can make the assessment around whether the gaze point falls on a different display and could publish just information about whether the mouse cursor needs to be repositioned and to which display.

Figure 5:
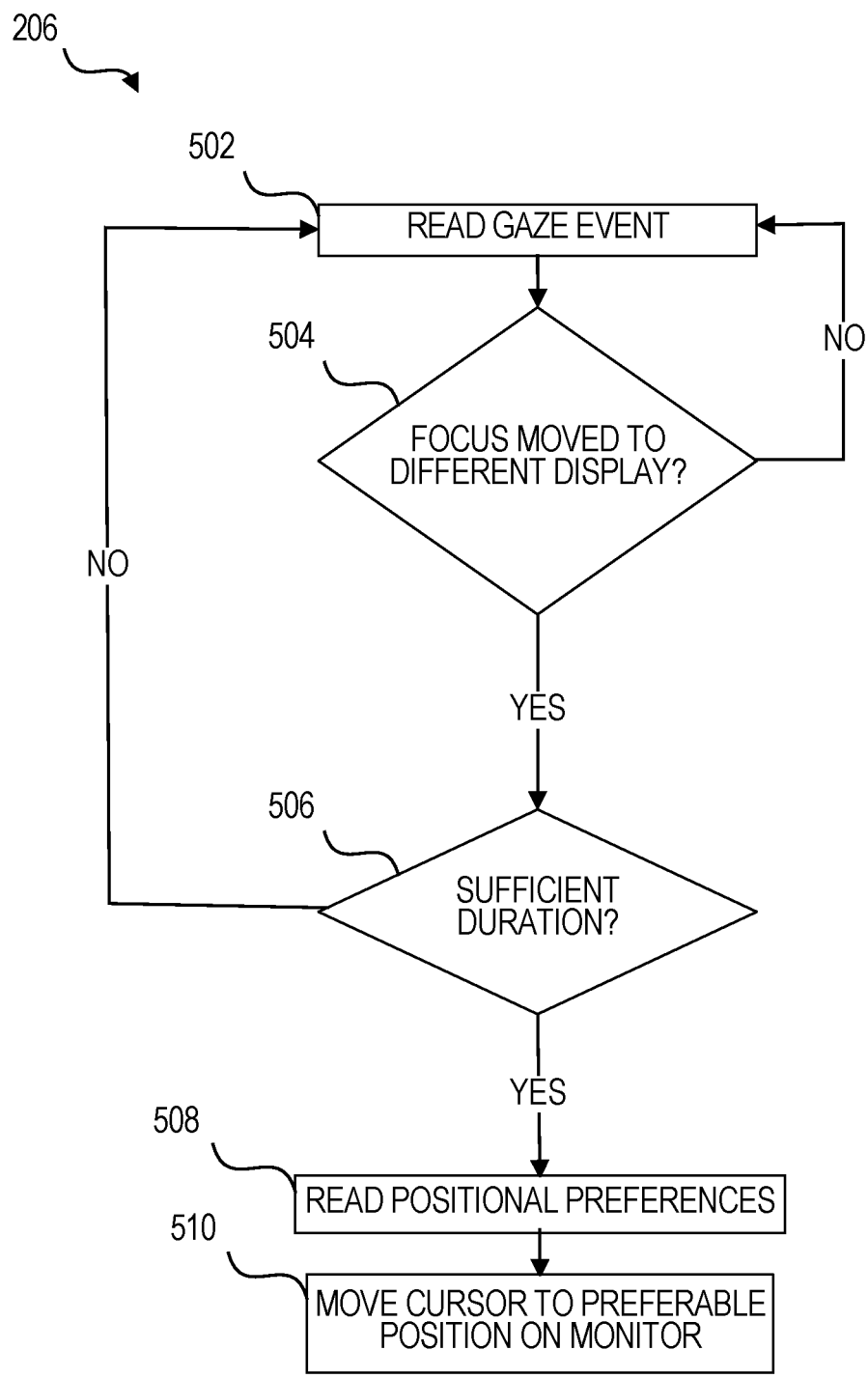
FIG. 5 is a flowchart illustrating sub-operations performed by a repositioning service in accordance with some examples of the present disclosure.

FIG. 5 is a flowchart illustrating sub-operations performed by a repositioning service 214 in accordance with some examples of the disclosure. During a repositioning operation 206, the repositioning service 214 consumes the gaze point information from the algorithm and makes a decision around whether to reposition the mouse cursor and, if so, on which display and where.

In operation 502, the repositioning service 214 reads the gaze point information.

In operation 504, the repositioning service 214 assesses whether the gaze point falls on a different display than the one where the mouse cursor is currently hosted. If not, the repositioning service 214 stops the current evaluation cycle and waits to read the next gaze point information in operation 502.

In operation 506, the repositioning service 214 assesses whether the user's gaze point has persisted on the new display for a sufficient duration. If not, the repositioning service 214 stops the current evaluation cycle and waits to read the next gaze point information in operation 502.

If the evaluation cycle gets to operation 508, then the mouse cursor will be repositioned on the new display. In operation 508, the repositioning service 214 reads the preferences for exactly where to place the mouse cursor. For example, the preference can be to always position the mouse cursor in the middle of the display.

In operation 510, the repositioning service 214 sends instructions to the operating system to move the mouse cursor to the position decided in operation 508.

Figure 7:
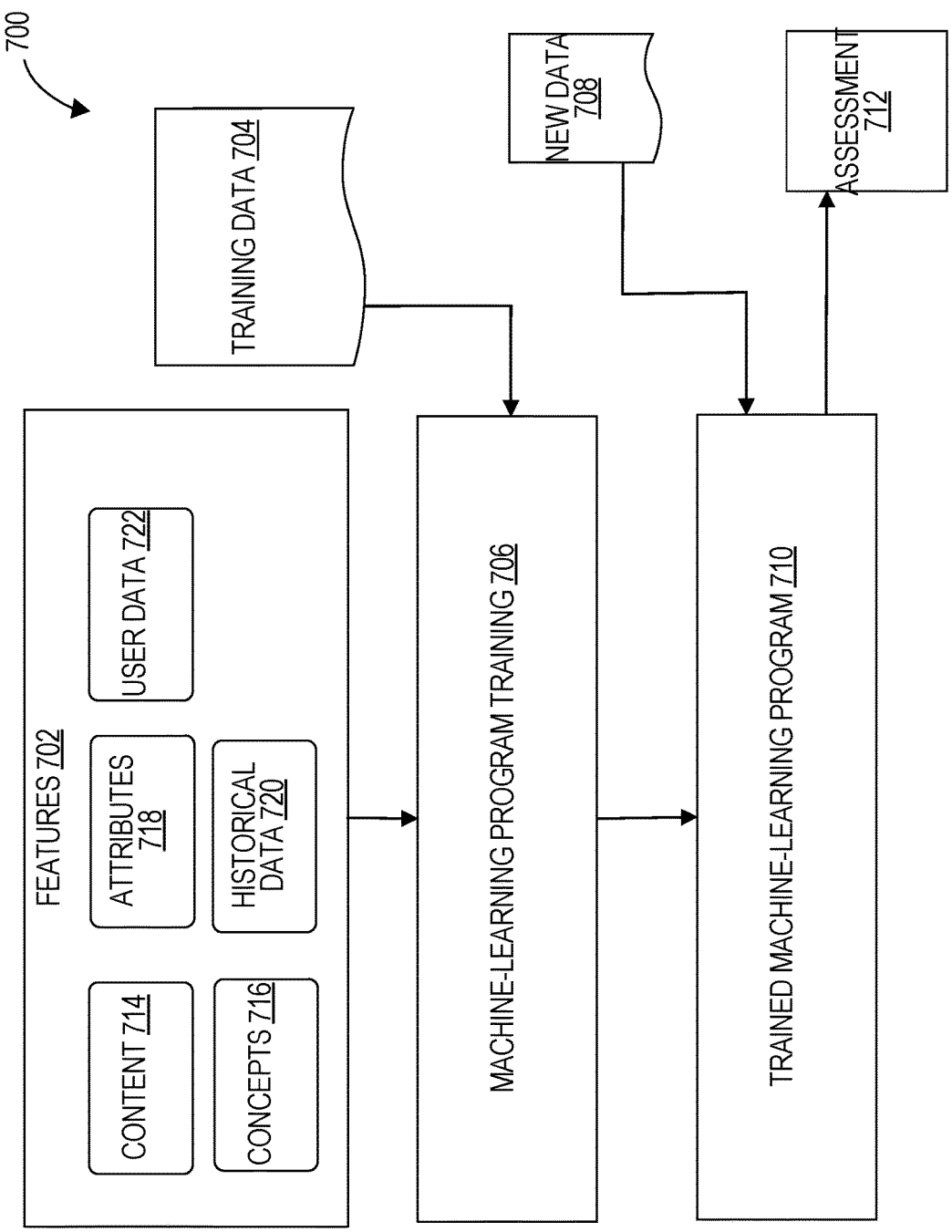
FIG. 7 illustrates training and use of a machine-learning program in accordance with some examples of the present disclosure.

FIG. 7 illustrates training and use of a machine-learning program 700, according to some examples of the present disclosure. In some examples, machine-learning programs (MLPs), also referred to as machine-learning algorithms or tools, are used to perform operations associated with gaze tracking.

Machine learning is a field of study that gives computers the ability to learn without being explicitly programmed. Machine learning explores the study and construction of algorithms, also referred to herein as tools, that can learn from existing data and make predictions about new data. Such machine-learning tools operate by building a model from example training data 704 in order to make data-driven predictions or decisions expressed as outputs or assessments (e.g., assessment 712). Although examples are presented with respect to a few machine-learning tools, the principles presented herein can be applied to other machine-learning tools.

In some examples, different machine-learning tools can be used. For example, Logistic Regression (LR), Naive- Bayes, Random Forest (RF), neural networks (NN), matrix factorization, and Support Vector Machines (SVM) tools can be used for classifying or scoring eye and head movements.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features 702 for analyzing the data to generate an assessment 712. Each of the features 702 is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features can be of different types, such as numeric features, strings, and graphs.

In one example, the features 702 can be of different types and can include one or more of content 714, concepts 716, attributes 718, historical data 720 and/or user data 722, merely for example.

The machine-learning algorithms use the training data 704 to find correlations among the identified features 702 that affect the outcome or assessment 712. In some examples, the training data 704 can include labeled data, which is known data for one or more identified features 702 and one or more outcomes, such as detecting eye movements, patterns of eye movements such as reading text, head movements, etc.

With the training data 704 and the identified features 702, the machine-learning tool is trained at machine-learning program training 706. The machine-learning tool appraises the value of the features 702 as they correlate to the training data 704. The result of the training is the trained machine-learning program 710.

When the trained machine-learning program 710 is used to perform an assessment, new data 708 is provided as an input to the trained machine-learning program 710, and the trained machine-learning program 710 generates the assessment 712 as output.

Figure 8:
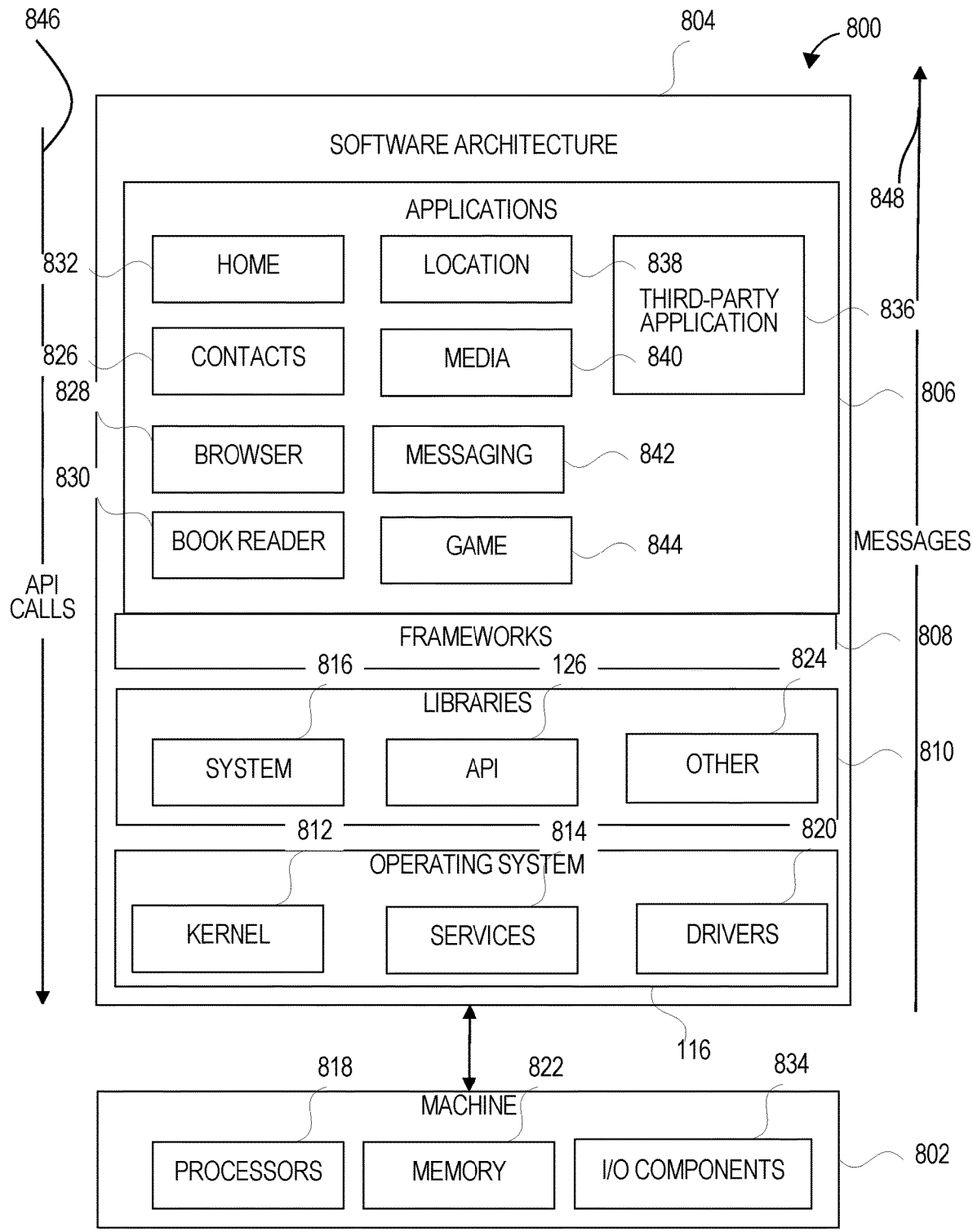
FIG. 8 is block diagram showing a software architecture within which the present disclosure can be implemented in accordance with some examples of the present disclosure.

12 FIG. 8 is a block diagram 800 illustrating a software architecture 804, which can be installed on any one or more of the devices described herein. The software architecture 804 is supported by hardware such as a machine 802 that can include processors 818, memory 822, and I/O components 834. In this example, the software architecture 804 can be conceptualized as a stack of layers, where each layer provides a particular functionality. The software architecture 804 can include layers such as an operating system 116, libraries 810, frameworks 808, and applications 806. Operationally, the applications 806 invoke API calls 846 through the software stack and receive messages 848 in response to the API calls 846.

The operating system 116 manages hardware resources and provides common services. The operating system 116 can include, for example, a kernel 812, services 814, and drivers 820. The kernel 812 acts as an abstraction layer between the hardware and the other software layers. For example, the kernel 812 provides memory management, Processor management (e.g., scheduling), component management, networking, and security settings, among other functionalities. The services 814 can provide other common services for the other software layers. The drivers 820 are responsible for controlling or interfacing with the underlying hardware. For instance, the drivers 820 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 810 provide a low-level common infrastructure used by the applications 806. The libraries 810 can include system libraries 816 (e.g., C standard library) that provide functions such as memory allocation functions, string manipulation functions, mathematic functions, and the like. In addition, the libraries 810 can include API libraries 126 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 824 to provide many other APIs to the applications 806.

The frameworks 808 provide a high-level common infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which can be specific to a particular operating system or platform.

In some examples, the applications 806 can include a home application 832, a contacts application 826, a browser application 828, a book reader application 830, a location application 838, a media application 840, a messaging application 842, a game application 844, and a broad assortment of other applications such as a third-party application 836. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 836 (e.g., an application developed using the ANDROID™ or IOS™ software development kit (SDK) by an entity other than the vendor of the particular platform) can be mobile software running on a mobile operating system such as IOS™, ANDROID™, WINDOWS® Phone, or another mobile operating system. In this example, the third-party application 836 can invoke the API calls 846 provided by the operating system 116 to facilitate functionality described herein.

Figure 9:
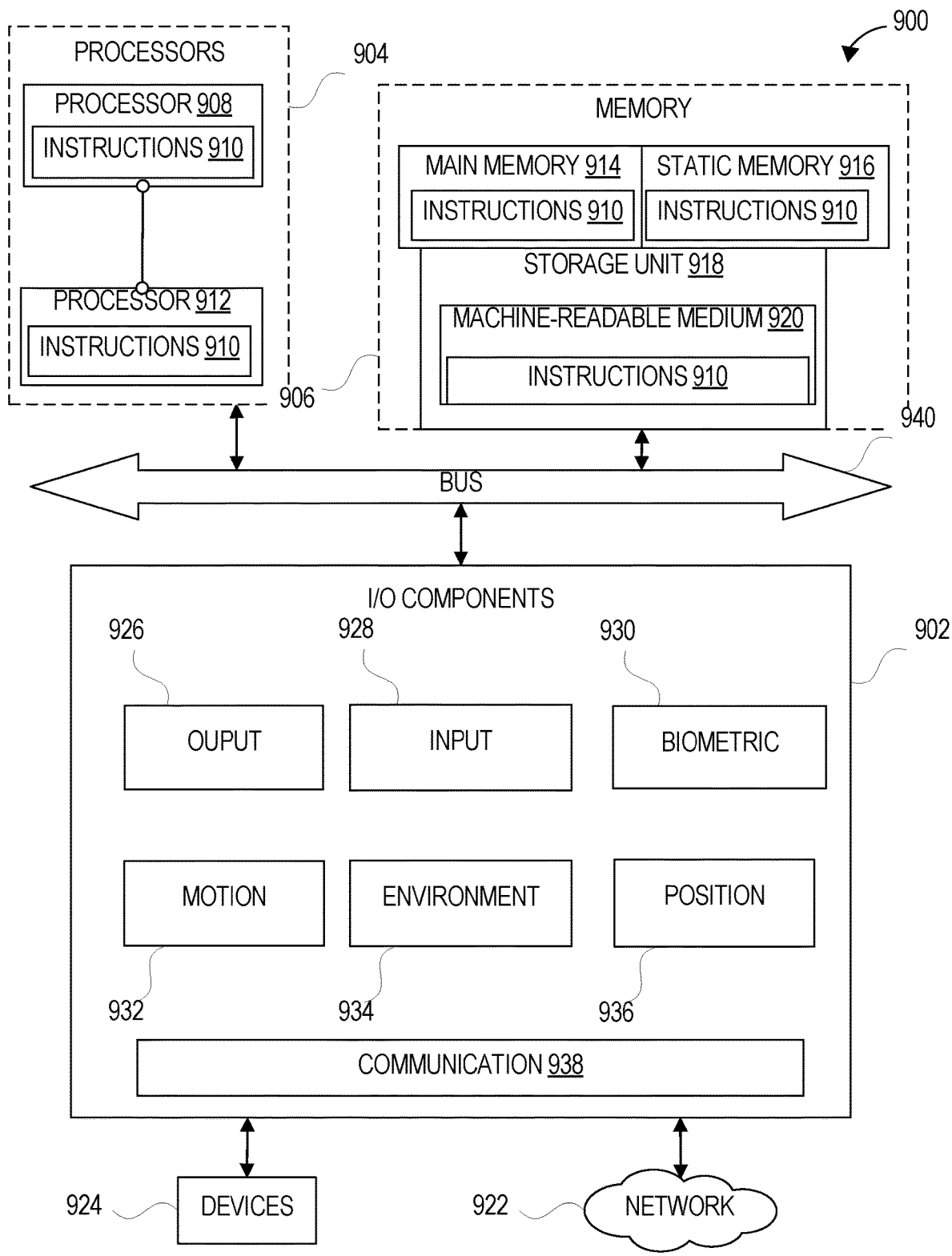
FIG. 9 is a diagrammatic representation of a machine in the form of a computing system within which a set of instructions can be executed in accordance with some examples of the present disclosure.

FIG. 9 is a diagrammatic representation of the machine 900 within which instructions 910 (e.g., software, a program, an application, an applet, an app, or other executable code) for causing the machine 900 to perform any one or more of the methodologies discussed herein can be executed. For example, the instructions 910 can cause the machine 900 to execute any one or more of the methods described herein. The instructions 910 transform the general, non-programmed machine 900 into a particular machine 900 programmed to carry out the described and illustrated functions in the manner described. The machine 900 can operate as a standalone device or can be coupled (e.g., networked) to other machines. In a networked deployment, the machine 900 can operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein.

Figure 10:
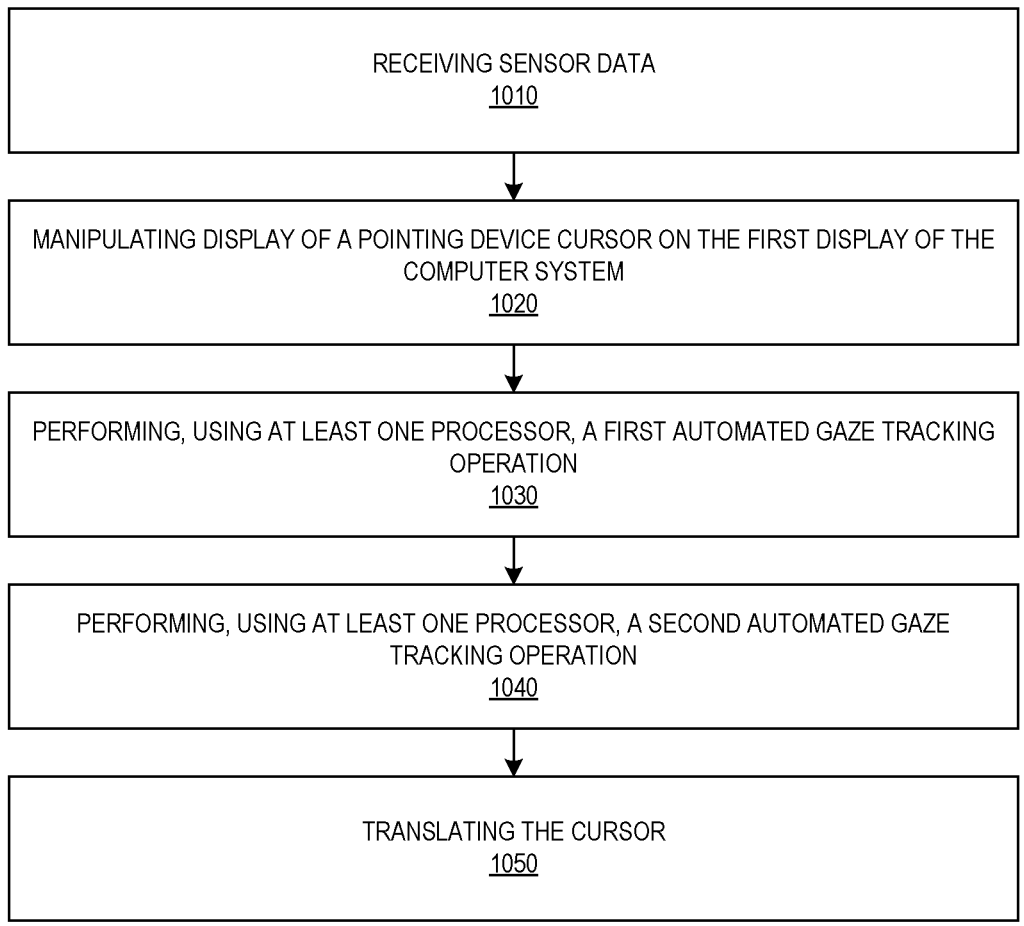
FIG. 10 is a flowchart illustrating a method in accordance with some examples of the present disclosure.

The machine 900 can include processors 904, memory 906, and I/O components 902, which can be included such as to communicate with each other via a bus 940. In some examples, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) can include, for example, a Processor 908 and a Processor 912 that execute the instructions 910. The term "Processor" is intended to include multi-core processors that can comprise two or more independent processors (sometimes referred to as "cores") that can execute instructions contemporaneously. Although FIG. 10 shows multiple processors 904, the machine 900 can include a single Processor with a single core, a single Processor with multiple cores (e.g., a multi-core Processor), multiple processors with a single core, multiple processors with multiples cores, or any combination thereof.

The memory 906 can include a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 can also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 can include a wide variety of components to receive input, provide output, produce output, transmit information, exchange information, capture measurements, and so on. The specific I/O components 902 that are included in a particular machine will depend on the type of machine. For example, portable machines such as mobile phones can include a touch input device or other such input mechanisms, while a headless server machine will likely not include such a touch input device. It will be appreciated that the I/O components 902 can include many other components that are not shown in FIG. 10. In various examples, the I/O components 902 can include output components 926 and input components 928. The output components 926 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 can include alphanumeric input components (e.g., a keyboard, a touch screen included such as to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 902 can include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope). The environmental components 934 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment. The position components 936 include location sensor components (e.g., a GPS receiver Component), altitude sensor components (e.g., altimeters or barometers that detect air pressure from which altitude can be derived), orientation sensor components (e.g., magnetometers), and the like.

Communication can be implemented using a wide variety of technologies. The I/O components 902 further include communication components 938 operable to couple the machine 900 to a network 922 or devices 924 via respective coupling or connections. For example, the communication components 938 can include a network interface component or another suitable device to interface with the network 922. In further examples, the communication components 938 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 can be another machine or any of a wide variety of peripheral devices (e.g., a peripheral device coupled via a USB).

Moreover, the communication components 938 can detect identifiers or include components operable to detect identifiers. For example, the communication components 938 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 938, such as location via Internet Protocol (IP) geolocation, location via Wi-Fi® signal triangulation, location via detecting an NFC beacon signal that can indicate a particular location, and so forth.

The various memories (e.g., main memory 914, static memory 916, and/or memory of the processors 904) and/or storage unit 918 can store one or more sets of instructions and data structures (e.g., software) embodying or used by any one or more of the methodologies or functions described herein. These instructions (e.g., the instructions 910), when executed by processors 904, cause various operations to implement examples described herein.

The instructions 910 can be transmitted or received over the network 922, using a transmission medium, via a network interface device (e.g., a network interface Component included in the communication components 938) and using any one of several well-known transfer protocols (e.g., hypertext transfer protocol (HTTP)). Similarly, the instructions 910 can be transmitted or received using a transmission medium via a coupling (e.g., a peer-to-peer coupling) to the devices 924.

FIG. 10 is a flowchart that describes a method of using a system to translate a cursor between multiple displays.

In operation 1010, the system receives sensor data indicative of a radial gaze direction of a user, the radial gaze direction having a horizontal component.

In operation 1020, the system manipulates display of a pointing device cursor on the first display of the computing system.

In operation 1030, the system performs, using at least one processor, a first automated gaze tracking operation to determine that the gaze of the user can be directed to the first display of the computing system at a first time, the first automated gaze tracking operation including comparing the received sensor data indicating a first radial gaze direction of the user at the first time with a predetermined relative position of the first screen to the second screen.

In operation 1040, the system performs, using at least one processor, a second automated gaze tracking operation to determine that the gaze of the user has transitioned to the second display of the computing system at a second time, the second automated gaze tracking operation including comparing the received sensor data indicating a second radial gaze direction of the user at the second time with a predetermined relative position of the second screen relative to the first screen.

In operation 1050, the system translates the cursor, in response to a determination that the gaze of the user has transitioned to the second display, from a first set of coordinates on the first display to a second set of coordinates on the second display independently of movement of the pointing device. The pointing device cursor can be movable between one of the first and second displays via corresponding movement of a pointing device.

In some examples, the system receives sensor data indicative of a tangential gaze direction of a user. For example, the sensor data can include at least one vertical component.

In some examples, the first set of coordinates and the second set of coordinates are the same or are analogously scaled to one another relative to a respective coordinate system of their respective displays. For example, if a first display has a resolution of 1920×1080 pixels and a second display has a resolution of 1920×1080 pixels, and a cursor is located at a first set of coordinates of [1000, 500] the cursor is translated to the second display to a second set of coordinates of [1000, 500] and the first set of coordinates and the second set of coordinates are the same. However, if the first display again has a resolution of 1920×1080 pixels but the second display has a resolution of 1280×720 pixels, and the cursor is located at the first set of coordinates of [1000, 500] the cursor is translated and scaled to a second set of coordinates of [667, 333] and the first set of coordinates and the second set of coordinates are analogous or scaled to the respective coordinate systems of the first display and the second display.

In some examples, the first set of coordinates and the second set of coordinates can be different, and the second set of coordinates can be at least partially determined based on the second automated gaze tracking operation and the second radial gaze direction.

In some examples, the first set of coordinates and the second set of coordinates can be different, and the second set of coordinates can be located at a center of the second display. In some examples, the first set of coordinates and the second set of coordinates can be different, and the second set of coordinates can be based on a previously used position of the cursor on the second display. In some examples, the method can include dynamically altering, in response to the translation, a visual characteristic of the pointing device cursor.

In some examples, the visual characteristic can include a size of the pointing device cursor. In some examples, the visual characteristic can include a color of at least a portion of the pointing device cursor. In some examples, dynamically altering the visual characteristic of the pointing device cursor can include reverting the visual characteristic of the pointing device cursor to a state before the dynamically altering.

In some examples, the system performs a setup operation. For example, the setup operation can include detecting that the computing system includes a first display and the second display. The setup operation can also include determining relative positioning of the first display and the second display. The setup operation can further include detecting that at least one camera.

In some examples, the system initiates a gaze tracking functionality, such as on the computing system and using the camera. For example, the gaze tracking functionality can be initiated such as to perform a first automated gaze tracking operation and a second automated gaze tracking operation. The method can also include receiving sensor data indicative of a radial gaze direction of a user, the radial gaze direction having a horizontal component.

In some examples, the system manipulates display of a pointing device cursor on the first display of the computing system. For example, the system translates the cursor, in response to a determination that the gaze of the user has transitioned to the second display, from a first set of coordinates on the first display to a second set of coordinates on the second display independently of movement of the pointing device. In some examples, the pointing device cursor is movable on one of the first and second displays via corresponding movement of a pointing device.

In some examples, determining of the relative positioning of the first display and the second display comprises querying an operating system of the computing system to determine relative positioning data for the first and second displays. In some examples, the determining of the relative positioning of the first display and the second display comprises prompting a user for relative positioning data for the first and second displays.

In some examples, determining of the relative positioning of the first display and the second display comprises inferring relative positioning data based on gaze tracking data captured for a specific user. In some examples, the inferring of the relative positioning data comprises detecting a pattern of change in a gaze point of a user. Also, the gaze tracking data can be used to determine a presence of the second display. Further, the gaze tracking data can be used to estimate a display size or resolution.

Figure 11:
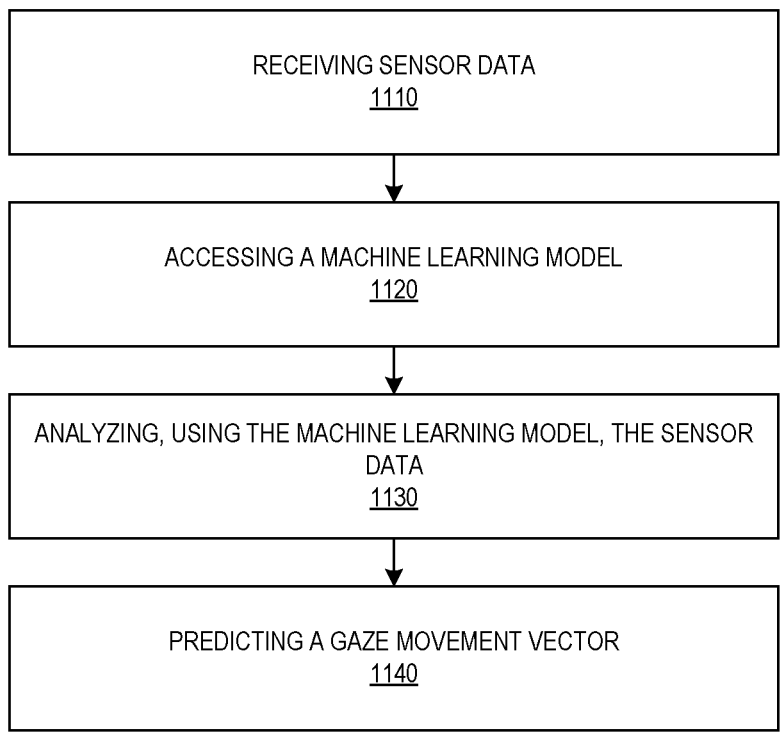
FIG. 11 is a flowchart further illustrating another method from in accordance with some examples of the present disclosure.

FIG. 11 is a flowchart that further describes the method from FIG. 10 in accordance with some examples of the present disclosure.

In operation 1110, the system receives sensor data indicative of a tangential gaze direction of a user having a vertical viewing component.

In operation 1120, the accesses a machine learning model to identify visual patterns based on the sensor data, the visual patterns corresponding to the radial gaze direction and the tangential gaze direction.

In operation 1130, the system analyzes, using the machine learning model, the sensor data to determine respective radial and tangential gaze directions at a plurality of time stamps.

In operation 1140, the system predicts, based on the respective radial and tangential gaze directions of at least two of the plurality of time stamps, a gaze movement vector. In some examples, translating the cursor can be based on the gaze movement vector and translating occurs before receiving sensor data indicative of a radial gaze direction of a user having a horizontal component and at a midpoint of the second display.

Examples and Notes

Exceptions and Variations of the MCOAD System

In some examples of the MCOAD system 110, the system infers the location of a display based on eye tracking activity. For example, a user's eye movements when engaged with a display are quite different than when a user is looking out of a window. In the same way that a gaze point can be determined by a machine learning model, machine learning can, as its input, use a pattern of changes in a user's gaze point, such as a reading-like eye movement. Then, as its output, distinguish whether a user is looking at a display. If the system notices a pattern that indicates that a user is looking at a display, then the system can attempt to move the mouse cursor to the gaze point on the display.

In some examples, the MCOAD system 110 infers the current display configuration based on whether a user's gaze point overlaps with any historical display configuration used with the system.

If the MCOAD system 110 attempts to move the mouse cursor to a gaze point and the operating system returns an error or the mouse positioning controller subsequently reads that the current mouse position is not on the desired display, it can reset the mouse to the position it was in previously and use this information to deduce that the desired display is not present. The system can then return to step 2 to adjust the configuration as needed.

In some examples, moving the mouse to the gaze point can be triggered by shaking the mouse or some similar mouse gesture.

The following, non-limiting examples, detail certain aspects of the present subject matter to solve the challenges and provide the benefits discussed herein, among others.

Example 1 is a method to move a pointing device cursor in a computing system having a first display and a second display, the method comprising: receiving sensor data indicative of a radial gaze direction of a user, the radial gaze direction having a horizontal component; manipulating display of a pointing device cursor on the first display of the computing system, wherein the pointing device cursor is movable on one of the first and second displays via corresponding movement of a pointing device; performing, using at least one processor, a first automated gaze tracking operation to determine that the gaze of the user is directed to the first display of the computing system at a first time, the first automated gaze tracking operation including comparing the received sensor data indicating a first radial gaze direction of the user at the first time with a predetermined relative position of the first screen to the second screen; performing, using at least one processor, a second automated gaze tracking operation to determine that the gaze of the user has transitioned to the second display of the computing system at a second time, the second automated gaze tracking operation including comparing the received sensor data indicating a second radial gaze direction of the user at the second time with a predetermined relative position of the second screen relative to the first screen; and translating the cursor, in response to a determination that the gaze of the user has transitioned to the second display, from a first set of coordinates on the first display to a second set of coordinates on the second display independently of movement of the pointing device.

In Example 2, the subject matter of Example 1, further comprising receiving sensor data indicative of a tangential gaze direction of a user having a vertical component.

In Example 3, the subject matter of any of Examples 1-2, wherein the first set of coordinates and the second set of coordinates are at least one of the same or analogously scaled to one another.

In Example 4, the subject matter of any of Examples 1-3, wherein the first set of coordinates and the second set of coordinates are different, and the second set of coordinates is at least partially determined based on the second automated gaze tracking operation and the second radial gaze direction.

In Example 5, the subject matter of any of Examples 1-4, wherein the first set of coordinates and the second set of coordinates are different, and the second set of coordinates is located at a center of the second display.

In Example 6, the subject matter of any of Examples 1-5, wherein the first set of coordinates and the second set of coordinates are different, and the second set of coordinates is based on a previously used position of the cursor on the second display.

In Example 7, the subject matter of any of Examples 1-6, further comprising dynamically altering, in response to the translation, a visual characteristic of the pointing device cursor.

In Example 8, the subject matter of Example 7, wherein the visual characteristic can include a size of the pointing device cursor.

In Example 9, the subject matter of any of Examples 7-8, wherein the visual characteristic can include a color of at least a portion of the pointing device cursor.

In Example 10, the subject matter of any of Examples 7-9, wherein dynamically altering the visual characteristic of the pointing device cursor can include reverting the visual characteristic of the pointing device cursor to a state before the dynamically altering.

In Example 11, the subject matter of any of Examples 1-10, further comprising: receiving sensor data indicative of a tangential gaze direction of a user having a vertical viewing component; and accessing a machine learning model to identify visual patterns based on the sensor data, the visual patterns corresponding to the radial gaze direction and the tangential gaze direction; and analyzing, using the machine learning model, the sensor data to determine respective radial and tangential gaze directions at a plurality of time stamps.

In Example 12, the subject matter of Example 11, further comprising predicting, based on the respective radial and tangential gaze directions of at least two of the plurality of time stamps, a gaze movement vector.

In Example 13, the subject matter of Example 12, wherein translating the cursor is based on the gaze movement vector and translating occurs before receiving sensor data indicative of a radial gaze direction of a user having a horizontal component and at a midpoint of the second display.

Example 14 is a method to move a pointing device cursor in a computing system having a first display and a second display, the method comprising: performing a set up operation including: detecting that the computing system can include the first display and the second display; determining relative positioning of the first display and the second display; detecting that the computing system can include a camera; and initiating gaze tracking functionality, on the computing system and using the camera, the gaze tracking functionality to perform a first automated gaze tracking operation and a second automated gaze tracking operation; receiving sensor data indicative of a radial gaze direction of a user, the radial gaze direction having a horizontal component; manipulating display of a pointing device cursor on the first display of the computing system, wherein the pointing device cursor is movable on one of the first and second displays via corresponding movement of a pointing device; translating the cursor, in response to a determination that the gaze of the user has transitioned to the second display, from a first set of coordinates on the first display to a second set of coordinates on the second display independently of movement of the pointing device.

In Example 15, the subject matter of Example 14, wherein the initiation of the gaze tracking functionality comprises a calibration process with respect to a specific user of the computing system.

In Example 16, the subject matter of Example 15, wherein the calibration process comprises performing a training operation to train a gaze tracking model for the specific user.

In Example 17, the subject matter of any of Examples 14-16, wherein the determining of the relative positioning of the first display and the second display comprises querying an operating system of the computing system to determine relative positioning data for the first and second displays.

In Example 18, the subject matter of any of Examples 14-17, wherein the determining of the relative positioning of the first display and the second display comprises prompting a user for relative positioning data for the first and second displays.

In Example 19, the subject matter of any of Examples 14-18, wherein the determining of the relative positioning of the first display and the second display comprises inferring relative positioning data based on gaze tracking data captured for a specific user.

In Example 20, the subject matter of Example 19, wherein the inferring of the relative positioning data comprises detecting a pattern of change in a gaze point of a user.

In Example 21, the subject matter of any of Examples 14-20, wherein the set up operation further comprises prompting a specific user for preference data related to user preferences for the specific user.

In Example 22, the subject matter of Example 21, wherein the preference data related to the user preferences comprises at least one of: location data regarding a location on the second display at which the pointing device cursor should be located during the automatic translation of the pointing device cursor from the first display to the second display; notification data regarding notification of the specific user regarding the automatic translation of the pointing device cursor from the first display to the second display.

In Example 23, the subject matter of any of Examples 14-22, wherein the gaze tracking data is used to determine a presence of the second display.

In Example 24, the subject matter of Example 23, wherein the gaze tracking data is used to estimate a display size or resolution.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

The above Detailed Description can include references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between the present disclosure and any documents so incorporated by reference, the usage in the present disclosure controls. In the present disclosure, the terms "including" and "in which" are used as the plain-English equivalents of the respective terms "comprising" and "wherein." Also, in the following claims, the terms "including" and "comprising" are open-ended, that is, a system, device, article, composition, formulation, or process that can include elements in addition to those listed after such a term in a claim are still deemed to fall within the scope of that claim.

In the present disclosure, the terms "a" or "an" are used, as is common in patent documents, to include one or more than one, independently of any other instances or usages of "at least one" or "one or more." In the present disclosure, the term "or" is used to refer to a nonexclusive or, such that "A or B" can include "A but not B," "B but not A," and "A and B," unless otherwise indicated. In the present disclosure, the terms "including" and "in which" are used as the plain-English equivalents of the respective terms "comprising" and "wherein." Also, in the following claims, the terms "including" and "comprising" are open-ended, that is, a system, device, article, composition, formulation, or process that can include elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A computer-implemented method comprising:
receiving sensor data indicative of a radial gaze direction of a user, the radial gaze direction having a horizontal component;
manipulating, by one or more processors, display of a pointing device cursor on a first display of a computing system, wherein the pointing device cursor is movable on one of the first display and a second display via corresponding movement of a pointing device;
performing, by the one or more processors, a first automated gaze tracking operation to determine that the gaze of the user is directed to the first display of the computing system at a first time, the first automated gaze tracking operation including comparing the received sensor data indicating a first radial gaze direction of the user at the first time with a predetermined relative position of the first display to the second display;
performing, by the one or more processors, a second automated gaze tracking operation to determine that the gaze of the user has transitioned to the second display of the computing system at a second time, the second automated gaze tracking operation including comparing the received sensor data indicating a second radial gaze direction of the user at the second time with a predetermined relative position of the second display relative to the first display;
translating the cursor, in response to a determination that the gaze of the user has transitioned to the second display, by the one or more processors, from a first set of coordinates on the first display to a second set of coordinates on the second display independently of movement of the pointing device; and
dynamically altering, in response to the translation, by the one or more processors, a visual characteristic of the pointing device cursor;
wherein the visual characteristic is at least one of:
a size of the pointing device cursor; or
a color of at least a portion of the pointing device cursor.

2. The method of claim 1, wherein dynamically altering the visual characteristic of the pointing device cursor comprises reverting the visual characteristic of the pointing device cursor to a state before the dynamically altering.

3. A computer-implemented method comprising:
receiving sensor data indicative of a radial gaze direction of a user, the radial gaze direction having a horizontal component;
manipulating, by one or more processors, display of a pointing device cursor on a first display of a computing system, wherein the pointing device cursor is movable on one of the first display and a second display via corresponding movement of a pointing device;
performing, by the one or more processors, a first automated gaze tracking operation to determine that the gaze of the user is directed to the first display of the computing system at a first time, the first automated gaze tracking operation including comparing the received sensor data indicating a first radial gaze direction of the user at the first time with a predetermined relative position of the first display to the second display;
performing, by the one or more processors, a second automated gaze tracking operation to determine that the gaze of the user has transitioned to the second display of the computing system at a second time, the second automated gaze tracking operation including comparing the received sensor data indicating a second radial gaze direction of the user at the second time with a predetermined relative position of the second display relative to the first display;
translating the cursor, in response to a determination that the gaze of the user has transitioned to the second display, by the one or more processors, from a first set of coordinates on the first display to a second set of coordinates on the second display independently of movement of the pointing device;
receiving, by the one or more processors, sensor data indicative of a tangential gaze direction of a user having a vertical viewing component;
accessing, by the one or more processors, a machine learning model to identify visual patterns based on the sensor data, the visual patterns corresponding to the radial gaze direction and the tangential gaze direction; and analyzing, by the one or more processors, using the machine learning model, the sensor data to determine respective radial and tangential gaze directions at a plurality of time stamps.

4. The method of claim 3, further comprising:

predicting, by the one or more processors, based on the respective radial and tangential gaze directions of at least two of the plurality of time stamps, a gaze movement vector.

5. The method of claim 4, wherein translating the cursor is based on the gaze movement vector and translating occurs before receiving sensor data indicative of a radial gaze direction of a user having a horizontal component and at a midpoint of the second display.

6. A computer-implemented method comprising:

performing, by one or more processors, a set up operation comprising:

detecting that a computing system includes a first display and a second display;

determining relative positioning of the first display and the second display;

detecting that the computing system includes a camera; and in response to detecting the first display, the second display, and the camera, performing operations comprising:

initiating gaze tracking functionality on the computing system and using the camera, the gaze tracking functionality performing a first automated gaze tracking operation and a second automated gaze tracking operation;

receiving sensor data indicative of a radial gaze direction of a user, the radial gaze direction having a horizontal component;

manipulating display of a pointing device cursor on the first display of the computing system, wherein the pointing device cursor is movable on one of the first and second displays via corresponding movement of a pointing device; and translating the cursor, in response to a determination that the gaze of the user has transitioned to the second display, from a first set of coordinates on the first display to a second set of coordinates on the second display independently of movement of the pointing device;

wherein the determining of the relative positioning of the first display and the second display comprises inferring relative positioning data based on gaze tracking data captured for a specific user; and wherein the inferring of the relative positioning data comprises detecting a pattern of change in a gaze point of a user.

7. The method of claim 6, wherein the set up operation further comprises prompting a specific user for preference data related to user preferences for the specific user.

8. The method of claim 7, wherein the preference data related to the user preferences comprises at least one of:

location data regarding a location on the second display at which the pointing device cursor should be located during a translation of the pointing device cursor from the first display to the second display;

notification data regarding notification of the specific user regarding the translation of the pointing device cursor from the first display to the second display.

* * * * *